(12) United States Patent
Lee

(10) Patent No.: US 7,102,879 B2
(45) Date of Patent: Sep. 5, 2006

(54) INDUSTRIAL COMPUTER HINGE ASSEMBLY

(75) Inventor: Steven Lee, 6F-4, No 5, Lane 176, Fukwo Rd., Hsinchuang City, Taipei Hsien (TW)

(73) Assignee: Steven Lee, Taipei Hsien (TW)

( * ) Notice: Subject to any disclaimer, the term of this patent is extended or adjusted under 35 U.S.C. 154(b) by 122 days.

(21) Appl. No.: 10/429,671

(22) Filed: May 6, 2003

(65) Prior Publication Data

US 2005/0094361 A1 May 5, 2005

(51) Int. Cl.
*G06F 1/16* (2006.01)

(52) U.S. Cl. .................... 361/681; 361/737; 312/223.3; 292/346; 411/305

(58) Field of Classification Search ......... 361/674–687, 361/724–727, 732; 312/223.1–223.6; 292/346; 411/305, 366.1
See application file for complete search history.

(56) References Cited

U.S. PATENT DOCUMENTS

| | | | | |
|---|---|---|---|---|
| 6,408,485 B1 | * | 6/2002 | Wu | 16/342 |
| 6,449,149 B1 | * | 9/2002 | Ohashi et al. | 361/687 |
| 2001/0010621 A1 | * | 8/2001 | O'Neal et al. | 361/683 |

* cited by examiner

*Primary Examiner*—Hung Van Duong
(74) *Attorney, Agent, or Firm*—Fei-Fei Chao; Bingham McCutchen LLP

(57) ABSTRACT

An industrial computer hinge assembly includes a bolt having a head and an extension, a first positioning ring with a first hook, a second positioning ring with a second hook, multiple leaf springs and an assembly device having an extension hole and a first fixing hole defined in a main board casing to correspond to the extension of the bolt and the first hook respectively and a hole and a second fixing hole defined in a screen casing to correspond to the extension and the second hook respectively. After the extension combines with the nut, engagement between the first positioning ring and the second positioning ring provides friction force to support the screen casing relative to the main board casing.

2 Claims, 6 Drawing Sheets

INDUSTRIAL COMPUTER HINGE ASSEMBLY

BACKGROUND OF THE INVENTION

1. Field of the Invention

The present invention relates to a computer hinge assembly, and more particularly to an industrial computer hinge assembly to allow the screen of the industrial computer to have sufficient support when pivoted relative to the main board.

2. Description of Related Art

In the current technology, computer hinges have been introduced to the market for many years and the computer hinges are quite different from one another in the function as well as in the structure. In spite of the differences, all the computer hinges serve one common function, that is, to allow the screen to pivot relative to the main board. Analysis of the current computer hinges shows that in order to mount the computer hinge onto the computer, most of the computer hinges increase the complexity of the computer structure and complexity increase generally is the cause of cost increase. Furthermore, if the structure of the computer hinge is complex, maintenance of the computer hinge will also be very complex and difficult especially when available space in the industrial computer is limited.

To overcome the shortcomings, the present invention tends to provide an improved industrial computer hinge to mitigate and obviate the aforementioned problems.

SUMMARY OF THE INVENTION

The primary objective of the present invention is to provide an improved industrial computer hinge to allow the screen casing to pivot relative to the main board casing easily.

In order to accomplish the foregoing objective, the computer hinge of the present invention has a bolt, a first positioning ring, a second positioning ring, multiple leaf springs and a nut. An assembly device includes a first extension in the main board casing, a first positioning hole also in the main board casing, a second positioning hole and a second extension hole in the screen casing. Extensions of the first hook into the corresponding first fixing hole and of the second hook into the corresponding second fixing hole respectively limit movements of the first positioning ring and the second positioning ring. Thus, when the screen casing is pivoted relative to the main board housing, the friction between the first and second positioning rings holds screen casing relative to the main board casing.

Other objects, advantages and novel features of the invention will become more apparent from the following detailed description when taken in conjunction with the accompanying drawings.

DETAILED DESCRIPTION OF THE PREFERRED EMBODIMENT

Figure 1:
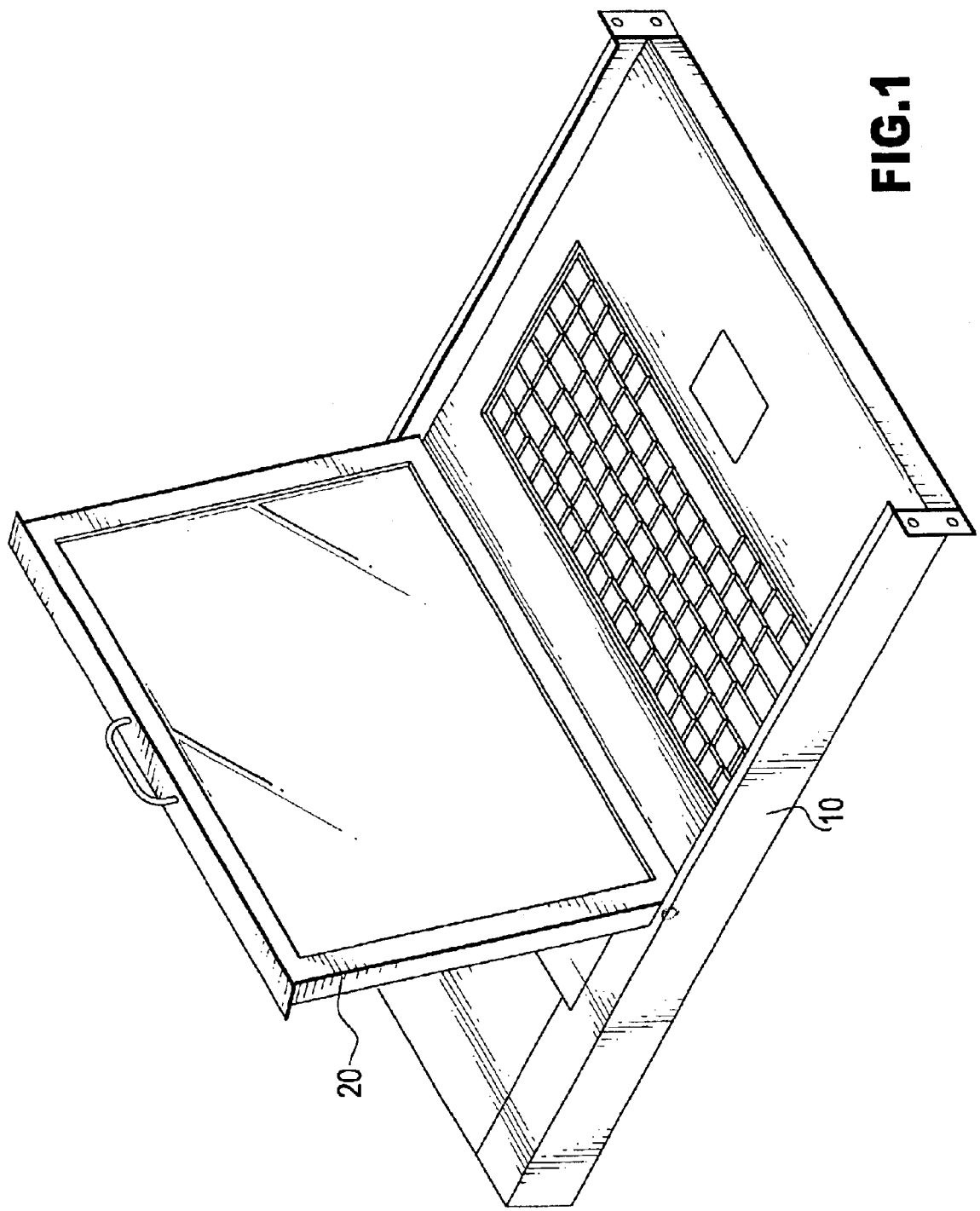
FIG. 1 is a perspective view of the industrial computer hinge assembly of the present invention.

With reference to FIG. 1, the industrial computer binge assembly in accordance with the present invention includes a main board casing (10), a screen casing (20) and a hinge (not shown). With the hinge sandwiched between the main board casing (10) and the screen casing (20), the screen casing (20) is able to be supported at a desired angle relative to the main board casing (10).

Figure 2:
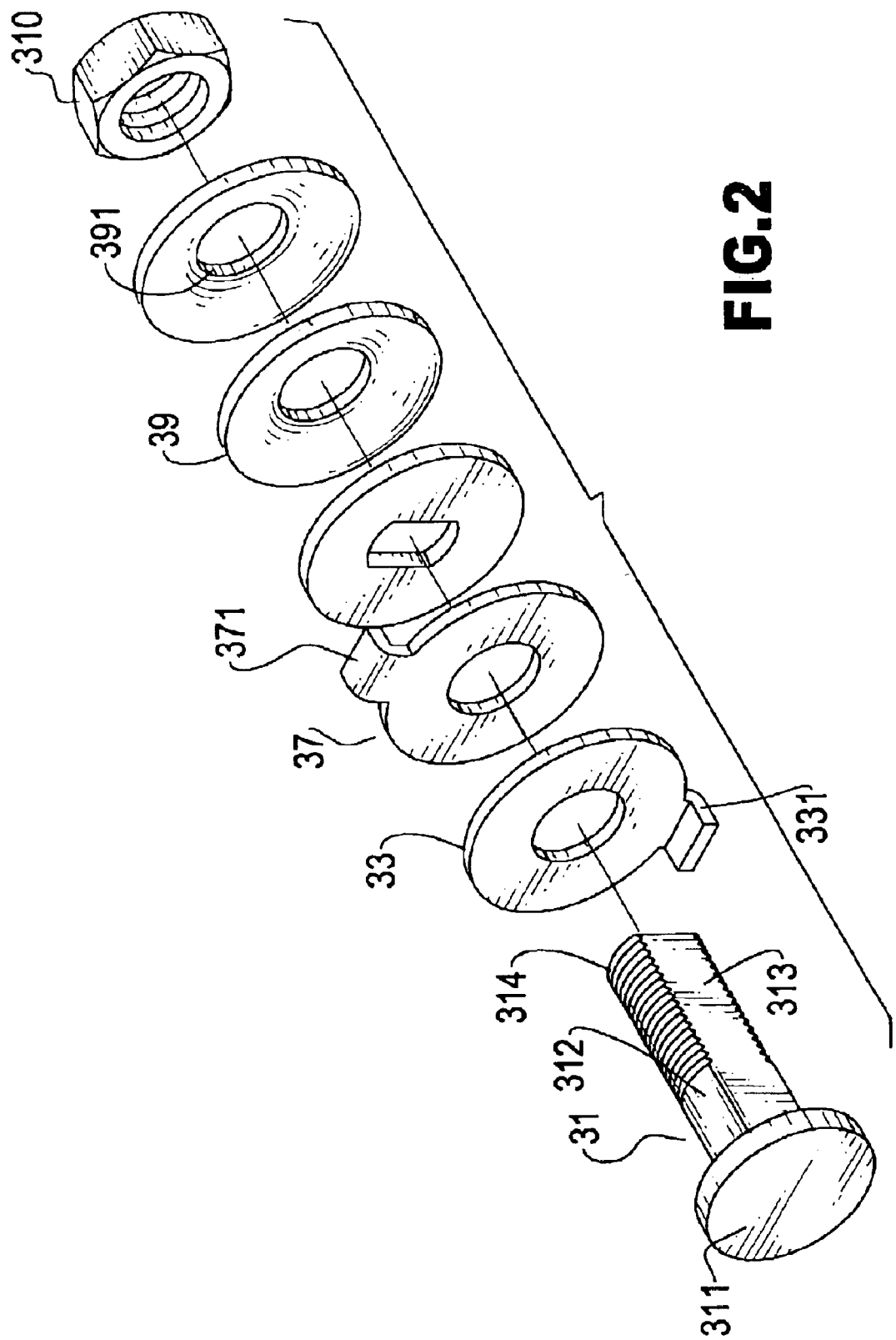
FIG. 2 is an exploded perspective view of the hinge of the present invention.

With reference to FIG. 2, the hinge of the present invention includes a bolt (31), a first positioning ring (33), a second positioning ring (37), multiple eaf springs (39) and a nut (310).

The bolt (31) has a head (311) and an extension (312) extending from a side face of the head (311). The extension (312) has a flat portion (313) formed on two opposite side faces of the extension (312) and a threading (314) formed and extended from a free end of the extension (312). The threading (314) is not extended to the side face of the head (311).

The first positioning ring (33) has a hole (not numbered) defined to correspond to the extension (312) and a first hook (331) formed on an outer periphery of the first positioning ring (33) and directed to a direction perpendicular to that of the first positioning ring (33).

The second positioning ring (37) has a hole (not numbered) defined to correspond to the extension (312) and a second hook (371) formed on an outer periphery of the second positioning ring (37) and directed to a direction perpendicular to that of the second positioning ring (37).

Each of the leaf springs (39) has a through hole (391) defined through the second leaf spring (39) to correspond to the extension (312). It is noted that at least one through hole (391) of the leaf springs (39) is so configured that after the extension (312) extends through the through hole (391), no relative movement between the extension (312) and the at least one leaf spring (39).

Figure 3:
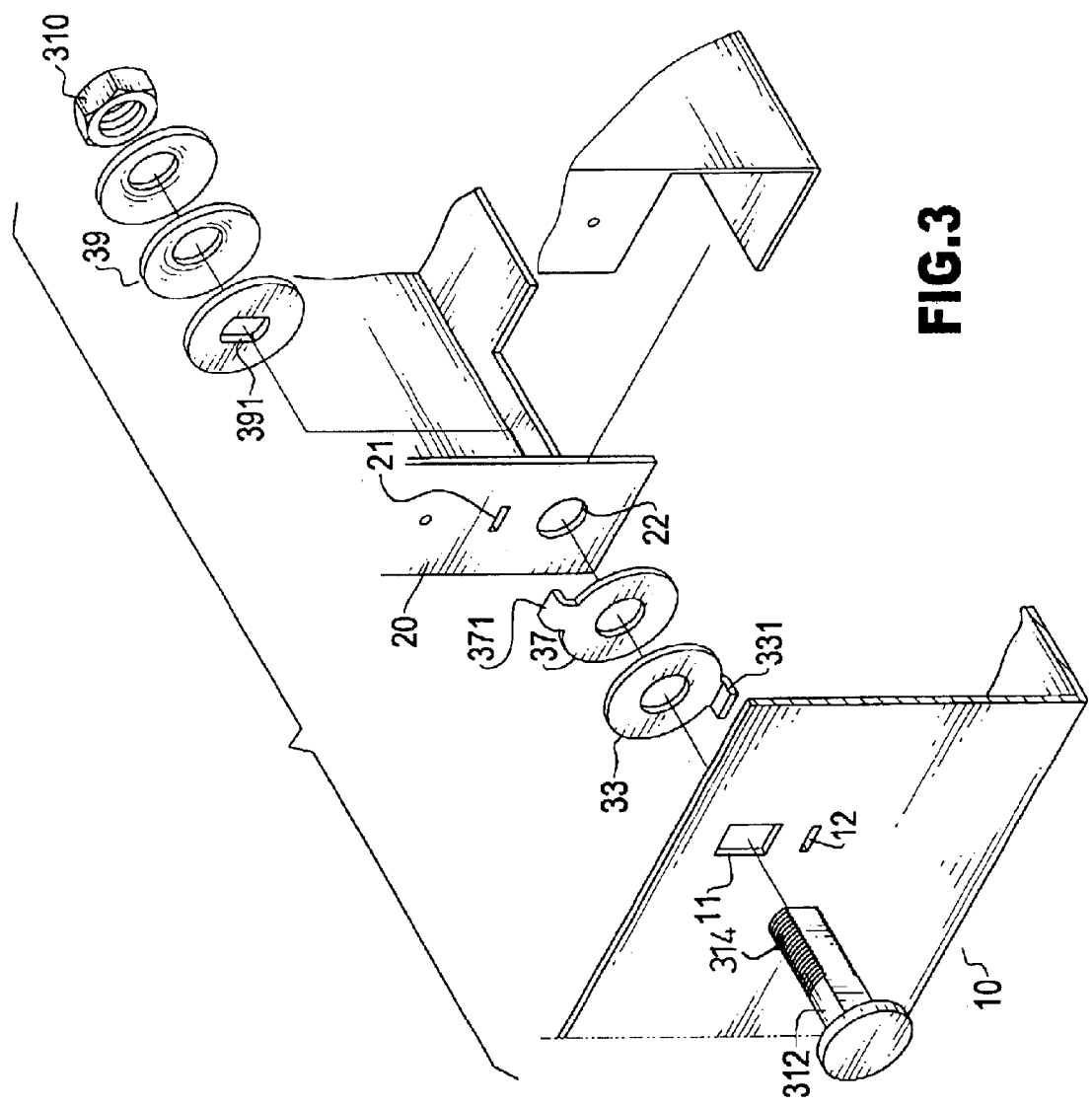
FIG. 3 is an exploded perspective view of the computer hinge assembly of the present invention.

With reference to FIG. 3, the computer hinge assembly of the present invention further has an extension hole (11) defined in the main board casing (10) to correspond to the extension (312), a first fixing hole (12) in the main board casing (10) to correspond to the first hook (331), a second fixing hole (21) in the screen casing (20) to correspond to the second hook (371) and a bole (22) in the screen casing (20) to correspond to the extension (312).

Figure 4:
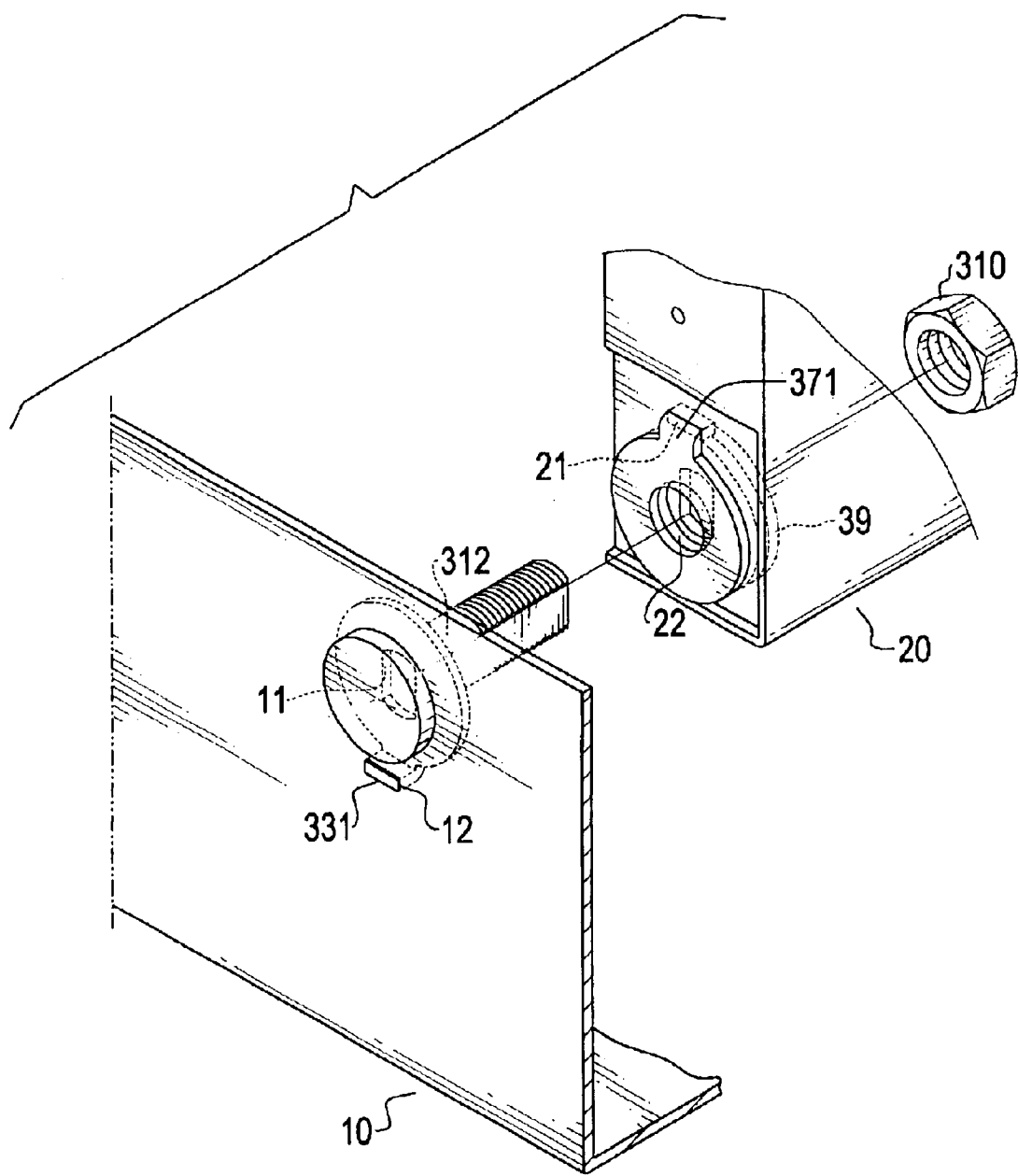
FIG. 4 is an exploded perspective view showing that the hinge is partially combined with the main board casing and partially combined with the screen casing.

With reference to FIG. 4, when the industrial computer hinge assembly of the present invention is in assembly, the bolt (31) is extended through the extension hole (11) in the main board casing (10), the first positioning ring (33), the second positioning ring (37) and the leaf springs (37). After the extension (312) is extended through the extension hole (11) and the first positioning ring (33), the first hook (331) of the first positioning ring (33) is received in the first fixing hole (12) of the main board casing (10). Meanwhile, the second hook (371) of the second positioning ring (37) is received in the second fixing hole (21). Therefore, after the first and second hooks (331,371) of the first and second positioning rings (33,37) are received in the first and second fixing holes (12,21), the first and second positioning rings (33,37) are fixed relative to the main board casing (10) and the screen casing (20) respectively.

Figure 5:
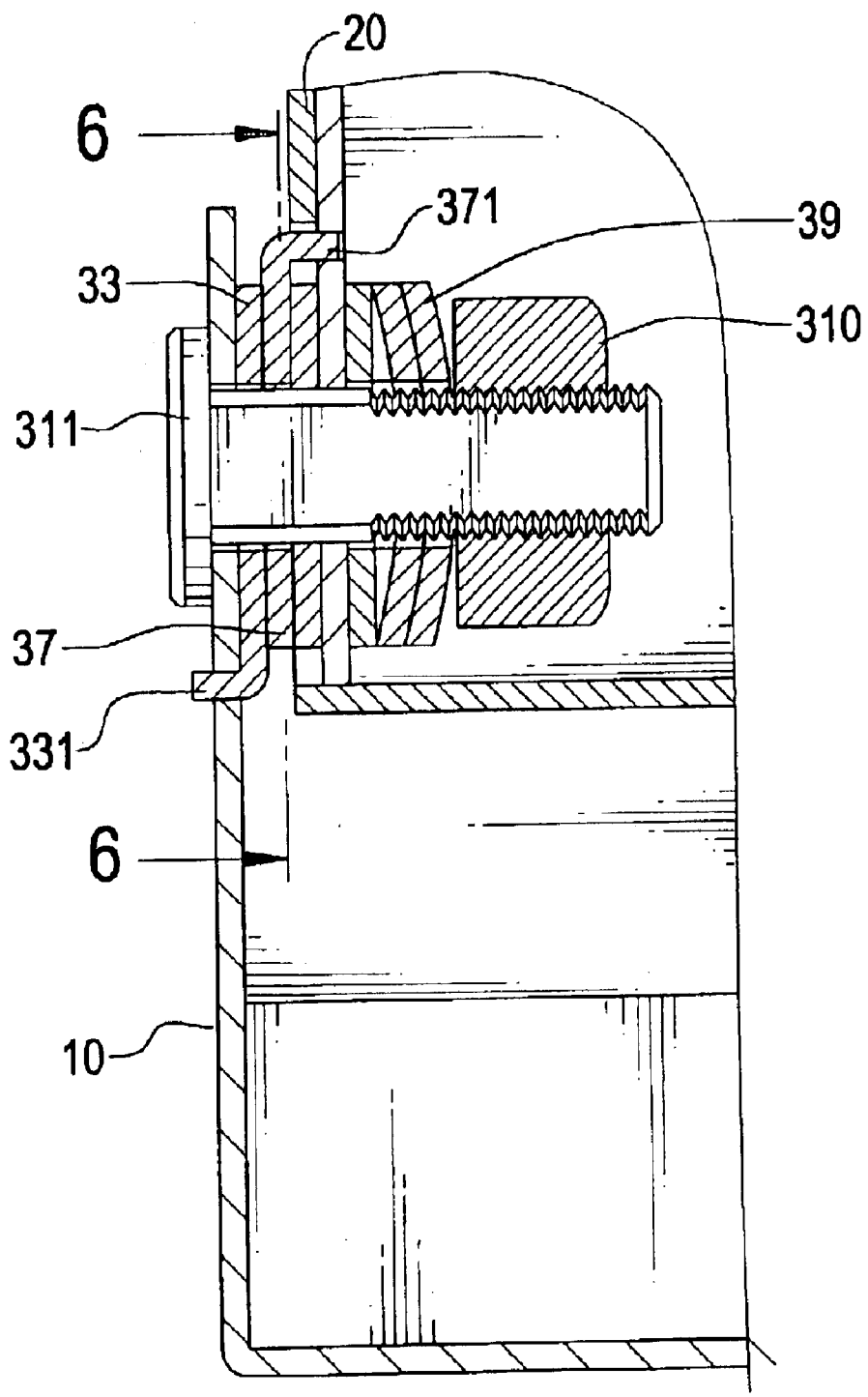
FIG. 5 is a schematic cross sectional view showing the hinge is assembled with both the main board casing and the screen casing.

With reference to FIG. 5, after the extension (312) extends through the first positioning ring (33), the extension (312) continues to extend through the hole (22), the second positioning ring (37) and the leaf springs (39) and then combines with the nut (310). From the drawing, it is noted that a length of the threading (314) is greater than a thickness of the nut (310) together with a thickness of the leaf springs (39). Therefore, when the extension (312) combines with the nut (310), the nut (310) will force the leaf springs (39) to closely engage with the first positioning ring (33) and the second positioning ring (37) respectively.

Besides, because at least one through hole (391) of the leaf springs (39) is so configured that after the extension (312) extends through the at least one through hole (391), there is no relative movement between the extension (312) and the at least one leaf spring (39).

Figure 6:
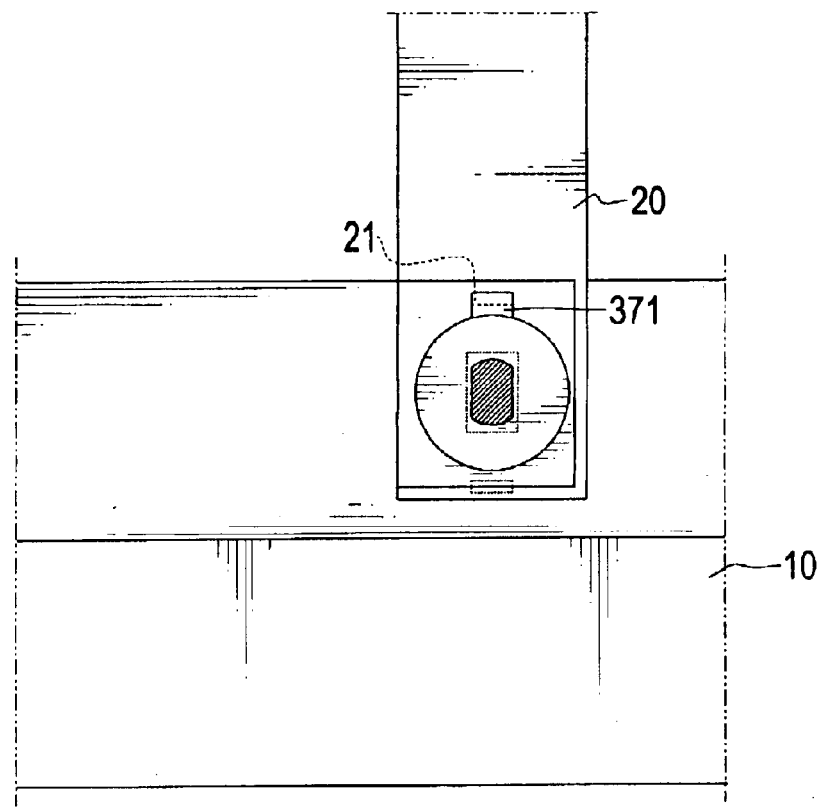
FIGS. 6 and 7 are schematic views showing the movement of the screen casing relative to the main board casing.
Figure 7:
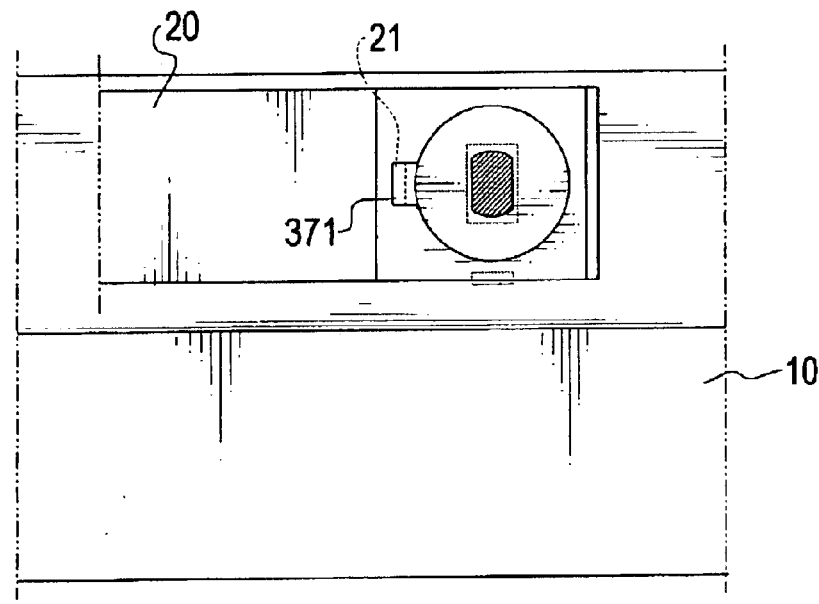

With reference to FIGS. 6 and 7, when the screen casing (20) is pivoted relative to the main board casing (10), the pivotal movement between the first and second positioning rings (33,37) provides friction force to support the screen casing (20) at a desired angle.

In summary, the hinge assembly is simple in structure so that there is no dramatic cost increase when adapting the hinge assembly of the present invention. Again, because the hinge assembly is arranged between the main board casing and the screen casing, friction is evenly distributed to the main board casing (10) and the screen casing (20).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An industrial computer hinge assembly comprising:

a bolt having a head and an extension extending from a side face of the head and a threading formed on the extension;

a first positioning ring with a first hook formed on an outer periphery of the first positioning ring;

a second positioning ring with a second hook formed on an outer periphery of the second positioning ring;

multiple leaf springs each with a through hole corresponding to the extension; and an assembly device comprising an extension hole and a first fixing hole defined in a main board casing to correspond to the extension of the bolt and the first hook respectively and a hole and a second fixing hole defined in a screen casing to correspond to the extension and the second hook respectively, wherein the bolt has a flat portion formed on two opposite sides of the bolt and the threading extending from a free end of the extension, wherein at least one through hole of one of the leaf springs is so configured that after the extension extends through the at least one through hole of the leaf spring, the extension is immovable relative to the one of the first leaf springs, whereby after the extension extends through the first positioning ring, the second positioning ring and the leaf springs to combine with the nut, engagement between the first positioning ring and the second positioning ring provides friction force to support the screen casing relative to the main board casing.

2. The industrial computer hinge assembly as claimed in claim 1, wherein the threading has a length larger than a thickness of the nut together with a thickness of the second leaf springs.

* * * * *